United States Patent [19]

Bohlmann

[11] Patent Number: 5,022,183

[45] Date of Patent: Jun. 11, 1991

[54] FLOWER POT CARRYING TRAY WITH RESTRAINING MEANS FOR PLURAL POTS

[75] Inventor: Lothar E. Bohlmann, Toronto, Canada

[73] Assignee: Kord Products Limited, Brampton, Canada

[21] Appl. No.: 429,324

[22] Filed: Oct. 31, 1989

[51] Int. Cl.⁵ .............................................. A01G 9/02
[52] U.S. Cl. ................................... 47/86; 47/71; 206/423; 206/560; 206/565; 220/507
[58] Field of Search .............. 206/423, 560, 562, 564, 206/565; 220/21; 229/2.5 R; 47/66, 83, 85, 86, 79, 71, 67, 87, 84

[56] References Cited

U.S. PATENT DOCUMENTS

| 3,142,133 | 7/1964 | Brooks . | |
|---|---|---|---|
| 3,660,934 | 5/1972 | Pollack et al. . | |
| 3,751,852 | 8/1973 | Schrepper | 229/2.5 R X |
| 3,904,103 | 9/1975 | Chadbourne . | |
| 3,949,524 | 4/1976 | Michelson | 47/79 |
| 3,965,616 | 6/1976 | Ridgeway | 206/423 X |
| 3,990,179 | 11/1976 | Johnson et al. | 47/83 X |
| 4,092,804 | 6/1978 | Morris et al. | 47/66 |
| 4,315,382 | 2/1982 | Kay et al. | 47/66 |
| 4,618,069 | 10/1986 | Quong . | |
| 4,684,013 | 8/1987 | Jacobs | 206/423 |
| 4,793,097 | 12/1988 | Whitcomb | 47/86 |

FOREIGN PATENT DOCUMENTS 7713224  6/1979  Netherlands ........................... 47/86

Primary Examiner—Bryon P. Gehman
Attorney, Agent, or Firm—Fish & Richardson

[57] ABSTRACT

A tray is disclosed for retaining a flower pot having a pot bottom with drain holes. The tray has a planar bottom wall for supporting the pot bottom and restrains the pot from moving parallel to the plane of the tray bottom wall. A protrusion is formed in the tray bottom wall in registration with a pot drain hole. The protrusion has a transverse lip adapted to overlie the pot bottom and restrains transverse movement relative to the plane of the tray bottom wall.

19 Claims, 4 Drawing Sheets

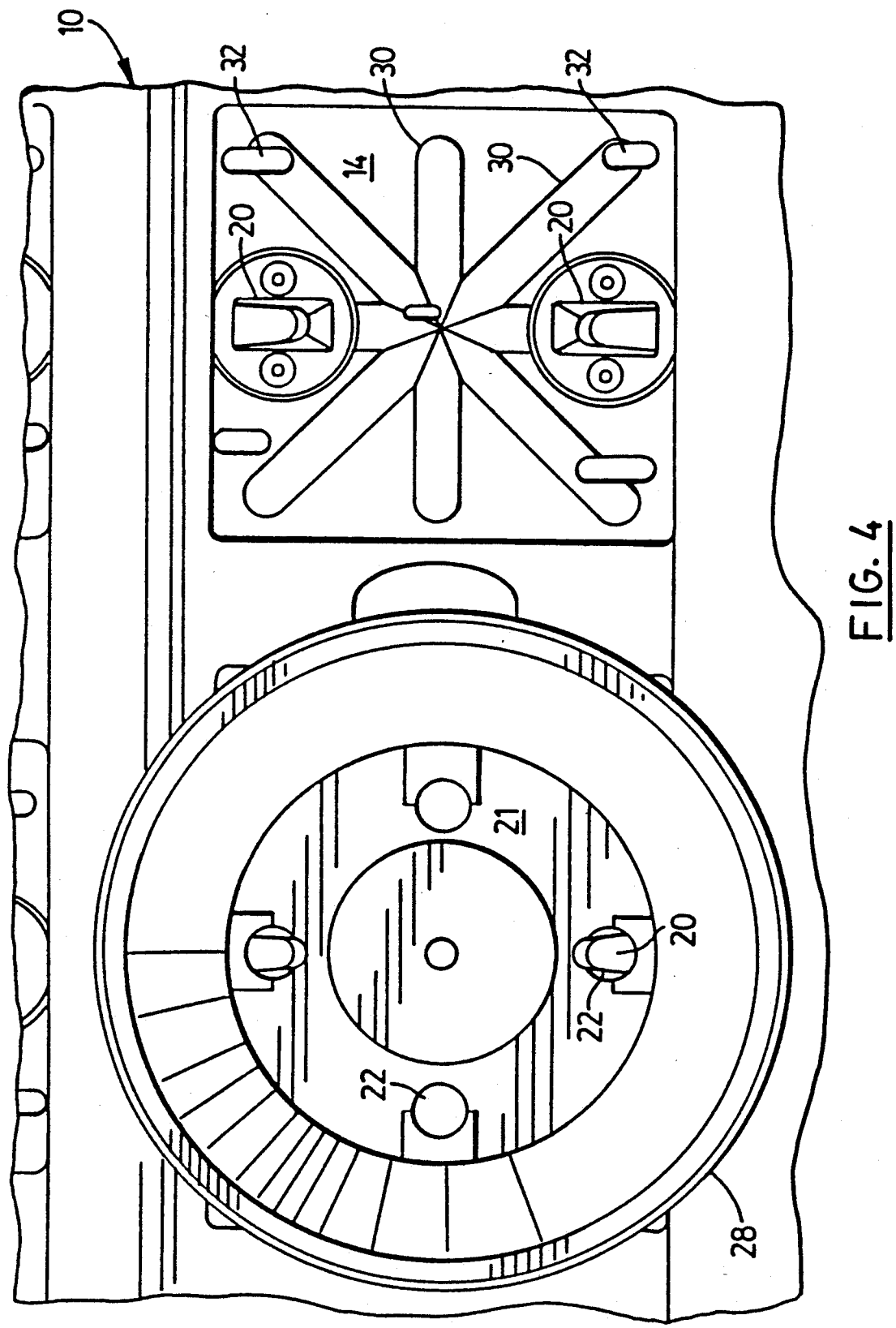

FLOWER POT CARRYING TRAY WITH RESTRAINING MEANS FOR PLURAL POTS

BACKGROUND OF THE INVENTION

This invention relates to a flower pot carrying tray, and more specifically, to a flower pot carrying tray made of thin plastic material In order to save on labour costs, nursery operations are currently mechanized or automated operations. Where it is desired to plant seeds or seedlings, hundreds, if not thousands of individual pots must be handled. First, the pots have to be filled with potting soil, and thereafter the seeds or seedings must be planted. In order to save on labour costs, methods have been developed to handle multiple pots at one time. One such example of this is shown in U.S. Pat. No. 4,684,013 issued on Aug. 4, 1987 to P. J. Jacobs, which shows a tray having a plurality of sections with ribbed walls that slope inwardly and are generally the same shape as the flower pot. A tray can be pushed onto inverted stacks of flower pots giving a friction fit between the tray and the flower pot such that the tray can be turned right side up and put on a conveyor belt. This patent was particularly suitable for polystyrene pots and trays.

A particular disadvantage of this prior art tray, however, is that if polypropylene and polyethylene is used for the pots or trays, the friction fit is not reliable enough.

The present invention seeks to provide a flower pot carrying tray which can be used with conventionally shaped flower pots and can grasp the flower pot when it is stacked upside down regardless of the material used to make the pot.

SUMMARY OF THE INVENTION

In accordance with one aspect of the invention, there is provided a tray for retaining a flower pot having drain holes formed in the bottom thereof. The tray comprises a planar bottom wall for supporting the bottom of the pot. Means is formed in the bottom wall for restraining the pot from movement parallel to the plane of the bottom wall. Also, a protrusion is formed in the tray bottom wall located in registration with a pot drain hole, the protrusion having a transverse lip adapted to overlie the pot bottom and restrain transverse movement thereof relative to the plane of the tray bottom wall.

The invention is illustrated in particular and preferred embodiments by reference to the accompanying drawings.

BRIEF DESCRIPTION OF THE DRAWINGS

FIG. 4 is a plan view similar to FIG. 2 showing the carrying tray containing a circular flower pot;

DETAILED DESCRIPTION OF PREFERRED EMBODIMENT

Figure 1:
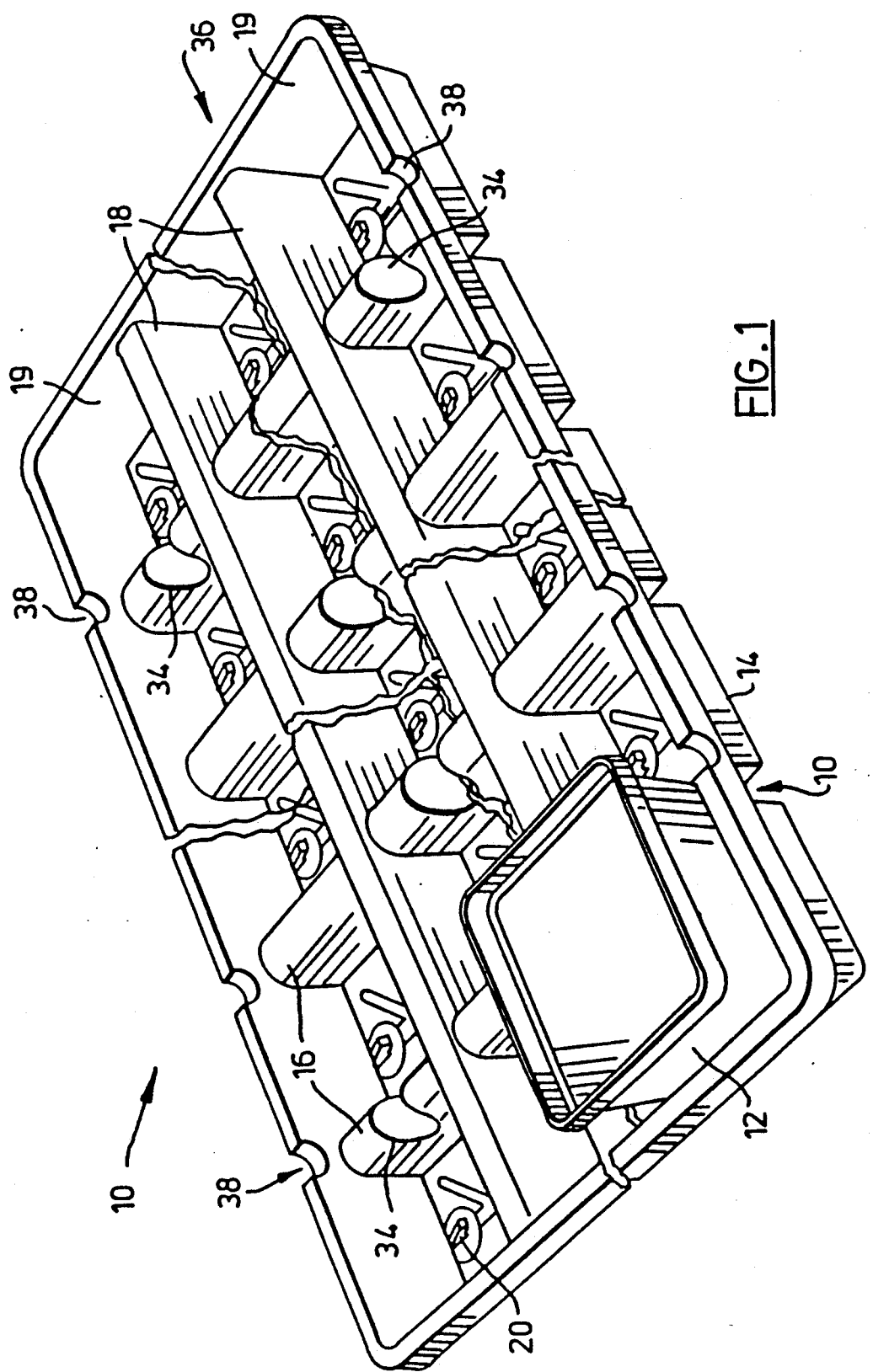
FIG. 1 is a perspective view of a flower pot carrying tray showing a plurality of sections with one section containing a pot.
Figure 2:
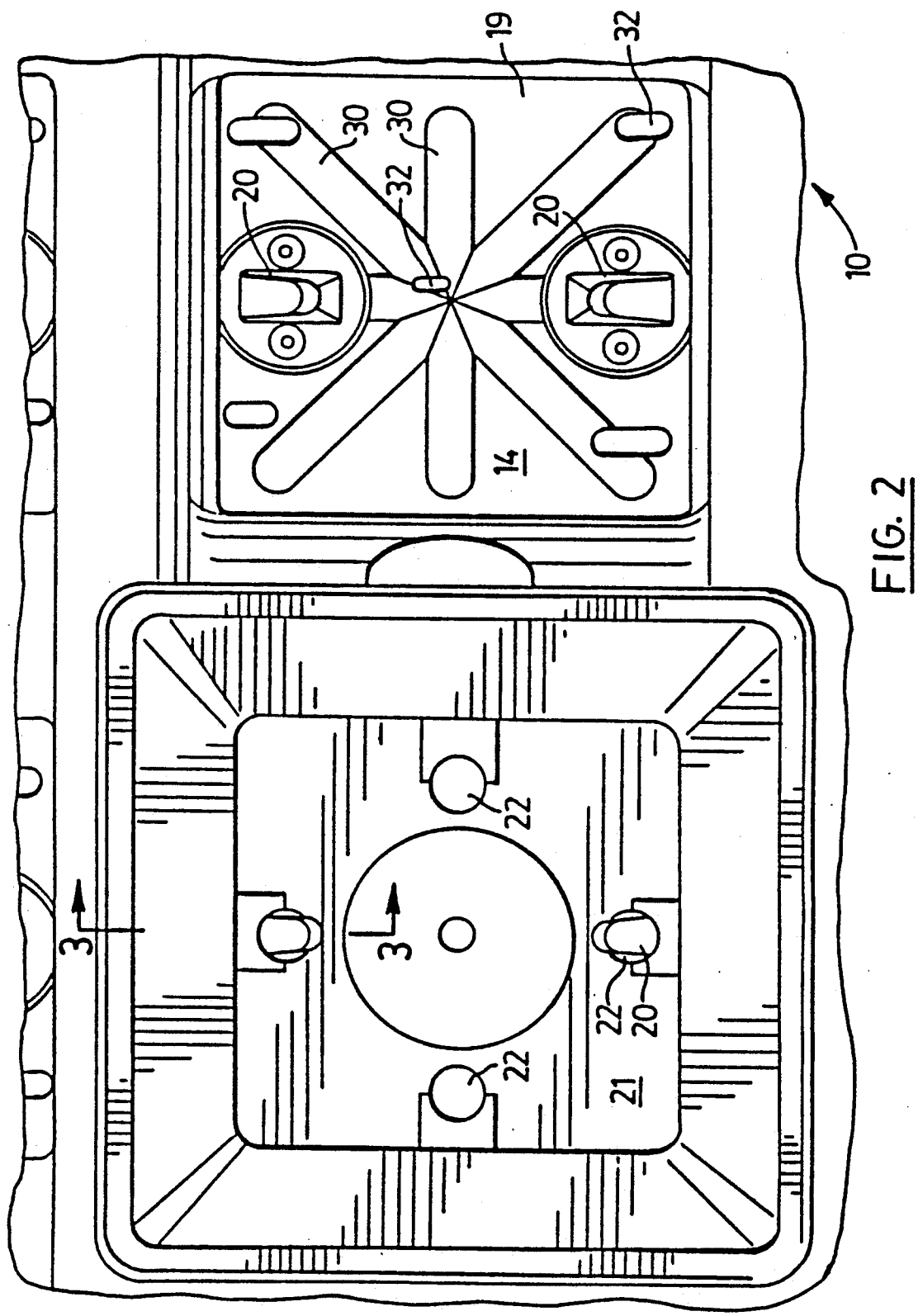
FIG. 2 is a plan view of a portion of the flower pot carrying tray taken along lines 2—2 of FIG. 1.

The tray 10 shown in FIG. 1 is adapted to carry a plurality of flower pots similar to flower pot 12 of known construction. Tray 10 has a bottom wall 14 having a plurality of intersecting perpendicular dividing walls 16 and 18 which define discrete sections 19, and which in turn are disposed about the periphery of and accommodate or engage a plurality of pot bottoms 21. A pair of protrusions 20 is formed in the bottom wall of each discrete section 19. As seen in FIGS. 2 and 4, channels 30 and holes 32 are formed in the bottom wall 14 to provide drainage.

Figure 5:
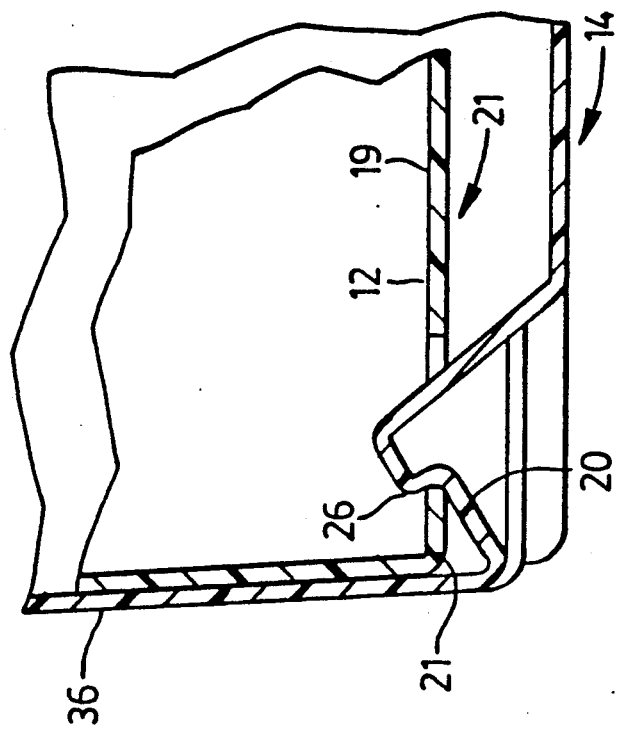
FIG. 5 is a vertical sectional view similar to FIG. 3 showing another embodiment of the carrying tray according to the present invention.
Figure 3:
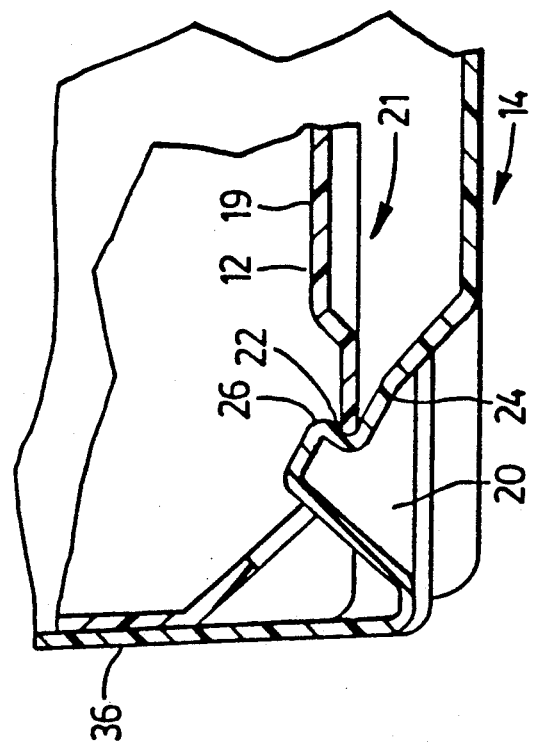
FIG. 3 is a vertical sectional view taken along lines 3—3 of FIG. 2.

As can be seen in FIGS. 2 and 4, first and second protrusions 20 are formed in the bottom wall 14. The protrusions 20 are located in registration with pot drain holes 22. As shown in FIGS. 3 and 5, the protrusion 20 is generally triangular in cross section and one side wall of the triangle has a notch 24 to form transverse lip 26.

As shown in FIGS. 2 and 3, the first and second protrusions 20 are orientated such that transverse lips 26 face each other. In an alternate embodiment shown in FIG. 5, the protrusions 20 are orientated such that the transverse lips 26 face away from each other.

In an alternate embodiment shown in FIG. 4, the tray can be used with round flower pots 28.

As shown in FIG. 1, a peripheral exterior wall 36 is integrally attached to bottom wall 14 and dividing walls 16 and 18 and is higher than dividing walls 16 and 18. Indentations 38 are formed in the peripheral wall 36 at staggered locations to prevent trays 10 from nesting so tightly that the trays cannot be separated. Similarly, indentations 34 are formed in dividing walls 16 to prevent a stack of trays 10 containing pots 12 from nesting and compacting the soil contained in filled pots 12. The size, shape and extent of the indentations 34 and 38 is a matter of choice.

The bottom wall 14 and/or the protrusions 20 are formed of resilient material, for instance polypropylene, polyethylene or polystyrene. A pot 12 is pushed onto the tray 10 in a section 19 displacing transverse lips 26 which then substantially return or snap back to their original positions to grasp the pot bottom 21. The type of material is a matter of choice. The trays are preferably made by vacuum forming or molding. The trays may have one discrete section 19 or a plurality of discrete sections 19 as shown in FIG. 1, and the number of discrete sections 19 is a matter of choice, dependent on the use.

Typically, tray 10 is loaded with a plurality of flower pots 12 by placing the tray 10 upside down on top of a plurality of stacks of even height of inverted flower pots 12. When the transverse lips 26 are orientated such that they face each other, as shown in FIG. 2, the centre of each discrete section 19 is pushed down causing the bottom wall 14 of the tray to arc which in turn causes the transverse lips 26 of the protrusions 20 to be pushed through drain holes 22 in the bottom of the flower pot 12. When the centre of each discrete section 19 is released, the transverse lips 26 return to their original positions and grasp flower pot bottom 21. When all the pots 12 are grasped, the tray 10 is turned right side up and put on a conveyor belt. To remove pots 12 from tray 10, the pots are pulled out of the tray and the tray bottom wall 14 and/or protrusions 20 bend enough to release the pots 12.

We therefore claim:

1. A tray for retaining a plurality of individual flower pots in a planar side by side relationship, each pot having a pot bottom and drain holes formed in the bottom thereof, the tray comprising:
    a planar bottom wall for supporting each bottom individually of said plurality of pots;
    planar restraining means formed in the bottom wall for restraining the pots from movement parallel to the plane of the bottom wall; and
    a plurality of spaced-apart protrusions formed in the bottom wall, each protrusion being located to register with a pot drain hole of an individual pot, each protrusion having a transverse lip adapted to overlie a bottom of a respective pot and restrain transverse movement of the respective pot relative to the plane of the bottom wall.

2. A tray as claimed in claim 1 wherein each protrusion is generally triangular in cross-section and wherein one side wall of each generally triangular protrusion has al notch to form a transverse lip, so that a pot bottom is able to rest on said protrusion side wall below said transverse lip and to be supported above said bottom wall.

3. A tray as claimed in claim 1 wherein said planar bottom walls is formed of resilient material.

4. A tray as claimed in claim 3 wherein each protrusion is generally triangular in cross-section and wherein one side wall of each generally triangular protrusion has a notch to form a transverse lip, so that a pot bottom is able to rest on said protrusion side wall below said transverse lip and to be supported above said bottom wall.

5. A tray as claimed in claim 1 wherein said protrusions are formed of resilient material.

6. A tray as claimed in claim 5 wherein each protrusion is generally triangular in cross-section and wherein one side wall of each generally triangular protrusion has a notch to form a transverse lip, so that a pot bottom is able to rest on said protrusion side wall below said transverse lip and to be supported above said bottom wall.

7. A tray for retaining a plurality of individual flower pots in a planar side by side relationship, each pot having a pot bottom and drain holes formed in the bottom thereof, the tray comprising:
    a planar bottom wall for supporting each bottom individually of said plurality of pots;
    planar restraining means formed in the bottom wall for restraining the pots from movement parallel to the plane of the bottom wall, including a plurality of intersecting dividing walls each formed in the bottom wall, which are perpendicular relative to each other and which define discrete sections for a plurality of flower pots;
    a plurality of spaced-apart protrusions formed in the bottom wall, each protrusion being located to register with a pot drain hole of an individual pot, each protrusion having a transverse lip adapted to overlie a bottom of a respective pot and restrain transverse movement of the respective pot relative to the plane of the bottom wall, and wherein said plurality of protrusions are located such that each discrete section has at least one protrusion located therein.

8. A tray as claimed in claim 7 wherein said plurality of protrusions are a plurality of first protrusions and further comprising a plurality of second protrusions, said plurality of first and second protrusions being located such that each discrete section has a first and second protrusion and said first and second protrusion being located to register with a first and second pot drain of an individual pot.

9. A tray as claimed in claim 8 wherein said first and second protrusions in each discrete section are orientated such that the transverse lips face each other.

10. A tray as claimed in claim 9 wherein the intersecting dividing walls are disposed about the periphery of and engaging the pot bottom of each of a plurality of flower pots.

11. A tray as claimed in claim 9 wherein said first and second protrusions are formed of resilient material.

12. A tray as claimed in claim 9 wherein said bottom wall is formed of resilient material.

13. A tray as claimed in claim 8 wherein said first and second protrusions in each discrete section are orientated such that the transverse lips face away from each other.

14. A tray as claimed in claim 13 wherein the intersecting dividing walls are disposed about the periphery of and engaging the pot bottom of each of a plurality of flower pots.

15. A tray as claimed in claim 13 wherein said first and second protrusions are formed of resilient material.

16. A tray as claimed in claim 13 wherein said bottom wall is formed of resilient material.

17. A tray as claimed in claim 7 wherein the intersecting dividing walls are disposed about the periphery of and engaging the pot bottom of each of a plurality of flower pots.

18. A tray as claimed in claim 7 wherein said protrusions are formed of resilient material.

19. A tray as claimed in claim 7 wherein said bottom wall is formed of resilient material.

* * * * *